US010807472B2

(12) United States Patent
Shimizu et al.

(10) Patent No.: US 10,807,472 B2
(45) Date of Patent: Oct. 20, 2020

(54) VEHICULAR DISPLAY DEVICE (71) Applicants: NIPPON SEIKI CO., LTD., Niigata (JP); SUBARU CORPORATION, Tokyo (JP)

(72) Inventors: Takanori Shimizu, Tokyo (JP); Kazufumi Suzuki, Tokyo (JP); Ryouta Fujiwara, Tokyo (JP); Yuka Hayakawa, Tokyo (JP); Ryousuke Kakimaru, Tokyo (JP); Shouma Nakata, Tokyo (JP); Yohei Okamoto, Tokyo (JP); Yuichi Nozaki, Niigata (JP)

(73) Assignees: NIPPON SEIKI CO., LTD., Niigata (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/624,638

(22) PCT Filed: Sep. 21, 2018

(86) PCT No.: PCT/JP2018/035163
§ 371 (c)(1),
(2) Date: Dec. 19, 2019

(87) PCT Pub. No.: WO2019/059367
PCT Pub. Date: Mar. 28, 2019

(65) Prior Publication Data
US 2020/0215916 A1 Jul. 9, 2020

(30) Foreign Application Priority Data

Sep. 25, 2017 (JP) ................. 2017-184107

(51) Int. Cl.
*B60K 35/00* (2006.01)
*G02F 1/1335* (2006.01)
*G02F 1/13357* (2006.01)

(52) U.S. Cl.
CPC ........ *B60K 35/00* (2013.01); *G02F 1/133514* (2013.01); *G02F 1/133524* (2013.01);
(Continued)

(58) Field of Classification Search
CPC .. B60K 35/00; B60K 37/02; B60K 2370/336; G01D 11/28; G02F 1/133524
See application file for complete search history.

(56) References Cited

U.S. PATENT DOCUMENTS

2012/0218493 A1* 8/2012 Funada ................. B60K 37/02
349/58
2014/0376204 A1* 12/2014 Kunitachi ............. G01D 11/28
362/23.16
(Continued)

FOREIGN PATENT DOCUMENTS

JP  2006194829 A  7/2006
JP  2011099760 A  5/2011
(Continued)

OTHER PUBLICATIONS

International Search Report and Written Opinion for PCT/JP2018/035163, dated Nov. 27, 2018.

*Primary Examiner* — Jia X Pan
(74) *Attorney, Agent, or Firm* — Maschoff Brennan; Brent A. Johnson; Yuefen Zhou (57) ABSTRACT A vehicular display device includes: a display board for displaying a scale; a liquid crystal display panel including an image display surface for displaying an image, and having an overlapping region in which the image display surface overlaps the display board further rearward than the display board; a light source for illuminating the liquid crystal display panel; and a first light guide body for receiving light from the light source via the liquid crystal display panel and emitting the light. The first light guide body includes: a light receiving part disposed between the overlapping region of
(Continued)

the image display surface and the display board, for receiving the light from the light source via the liquid crystal display panel; and a light-emitting part exposed outwardly from the display board as viewed by a viewer, for emitting light from the first light guide body that is received by the light-receiving part.

6 Claims, 5 Drawing Sheets

(52) U.S. Cl.
CPC .. *G02F 1/133603* (2013.01); *B60K 2370/152* (2019.05); *B60K 2370/336* (2019.05)

(56) References Cited

U.S. PATENT DOCUMENTS

| | | | | |
|---|---|---|---|---|
| 2016/0091346 | A1* | 3/2016 | Otani | G02B 5/0226 362/23.16 |
| 2017/0153486 | A1* | 6/2017 | Ahn | G04G 17/045 |
| 2018/0134159 | A1* | 5/2018 | Tane | B60K 35/00 |

FOREIGN PATENT DOCUMENTS

| | | | |
|---|---|---|---|
| JP | 2016090402 A | 5/2016 |
| JP | 2016090403 A | 5/2016 |
| JP | 2016531791 A | 10/2016 |
| JP | 2017003468 A | 1/2017 |

\* cited by examiner

VEHICULAR DISPLAY DEVICE

CROSS REFERENCE TO RELATED APPLICATIONS

This application is a national phase of International Patent Application No. PCT/JP2018/035163, filed Sep. 21, 2018, which claims priority to Japanese Patent Application No. 2017-184107, filed Sep. 25, 2017, all of which are incorporated by reference herein in their entirety.

TECHNICAL FIELD

The present disclosure relates to a vehicular display device.

BACKGROUND ART

In Patent Literature 1, a vehicular display device is described that is equipped with a light source, a liquid crystal display panel illuminated by the light source, a display board that partially overlaps an image display surface of the liquid crystal display panel and allows transmission of light only at a scale part, and a transmission part disposed at a periphery of the display board and emitting light received from the light source via the liquid crystal display panel.

CITATION LIST

Patent Literature

Patent Literature 1: Unexamined Japanese Patent Application Kokai Publication No. 2016-90403

SUMMARY OF INVENTION

Technical Problem

When using the configuration described in the aforementioned Patent Literature 1, a driver may directly visually recognize the image display surface of the liquid crystal display panel through the transmission part. Thus there is room for improvement of appearance of the vehicular display device.

In consideration of the aforementioned circumstances, an objective of the present description is to provide a vehicular display device having good appearance.

Solution to Problem

In order to attain the aforementioned objective, a vehicular display device according to the present description includes: a liquid crystal display panel including (i) a display board configured to display a design, (ii) a liquid crystal display panel including an image display surface configured to display an image, and having an overlapping region in which the image display surface overlaps the display board further rearward than the display board; (iii) a light source configured to illuminate the liquid crystal display panel; and (iv) a light guide body configured to emit light received through the liquid crystal display panel from the light source. The light guide body includes: (i) a light-receiving part configured to receive light through the liquid crystal display panel from the light source, the light-receiving part being disposed between the display board and the overlapping region of the image display surface; and (ii) a light-emitting part configured to emit light from the light guide body that is received by the light-receiving part, the light-emitting part being exposed outwardly from the display board as viewed by a viewer.

Advantageous Effects of Invention

According to the aforementioned configuration, the light guide body is provided, and thus direct visual recognition by the driver of light from the light source via the liquid crystal display panel can be suppressed. Therefore, a vehicular display device can be provided that has good appearance.

DESCRIPTION OF EMBODIMENTS

An embodiment of a vehicular display device according to the present description is described with reference to FIGS. 1 to 5. In the below description of the vehicular display device, a direction of approach toward the driver, that is, the viewer, is specified as the forward direction, and the direction of separation from the driver is specified as the rearward direction.

Configuration

Figure 1:
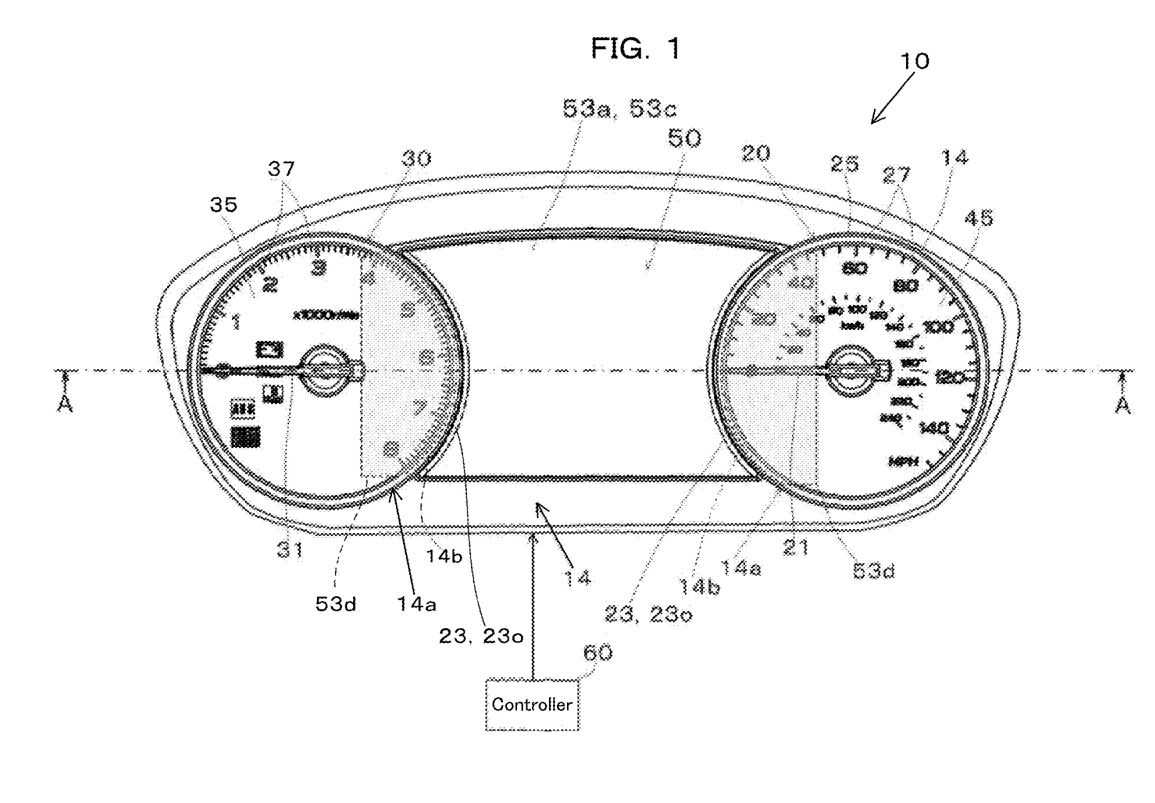
FIG. 1 is a front view of a vehicular display device according to an embodiment of the present description.

As illustrated in FIG. 1, the vehicular display device 10 according to the embodiment is equipped with: a first indicating needle-type meter 20 arranged rightward as viewed by the driver, a second indicating needle-type meter 30 arranged leftward, a liquid crystal display unit 50 disposed between the first indicating needle-type meter 20 and the second indicating needle-type meter 30, and a controller 60 for control of overall operation of the vehicular display device 10.

The first indicating needle-type meter 20 indicates speed of a vehicle by a position of an indicating needle 21 relative to a scale (index) 27 formed in a display board 25. The second indicating needle-type meter 30 indicates an engine rotational speed by a position of an indicating needle 31 relative to a scale 37 formed in the display board 35. The liquid crystal display unit 50 displays various types of vehicle information on an image display surface 53c corresponding to a front surface thereof.

Figure 2:
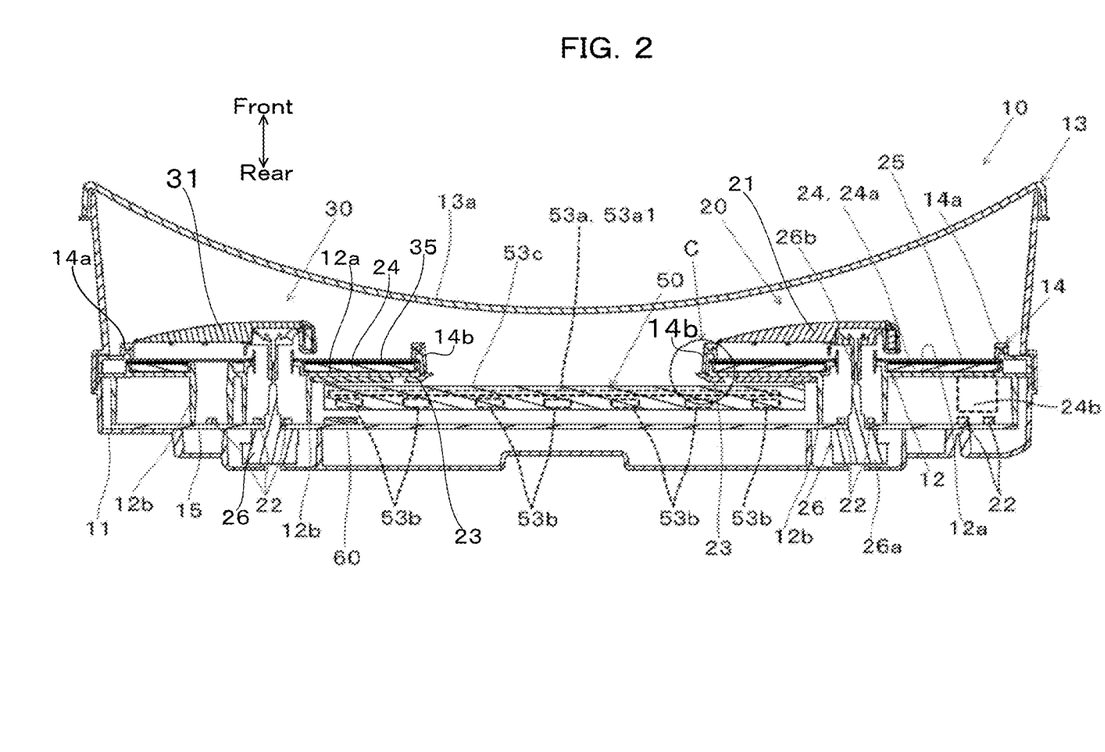
FIG. 2 is a cross-sectional view taken along line A-A of FIG. 1.

More specifically, as illustrated in FIG. 2 that is a cross-sectional view taken at line A-A of FIG. 1, the vehicular display device 10 is equipped with a rear case 11, a middle case 12, a front case 13, a facing member 14, and a circuit board 15, in addition to the first and second indicating needle-type meters 20 and 30 and the liquid crystal display unit 50.

The rear case 11 is formed from a transparent resin such as polypropylene. The rear case 11 has a box-like shape that is open toward the forward direction. The first and second indicating needle-type meters 20 and 30 are contained by the liquid crystal display unit 50 within the rear case 11.

The circuit board 15 has a plate-like shape and is substantially rectangular. A circuit board 15 is disposed at a bottom surface of the rear case 11. On the circuit board 15 are mounted multiple light sources 22 for illuminating the first and second indicating needle-type meters 20 and 30, and a controller 60 for controlling the liquid crystal display unit 50, the light sources 22, and a below-described indicating needle driver 26. The light sources 22 include light emitting diodes (LEDs) for emitting light of a prescribed color, such as white light. The light sources 22 are arranged on a front surface of the circuit board 15. The controller 60 includes a central processing unit (CPU), an image processing integrated circuit (IC), a read only memory (ROM), and a random access memory (RAM).

Figure 5:
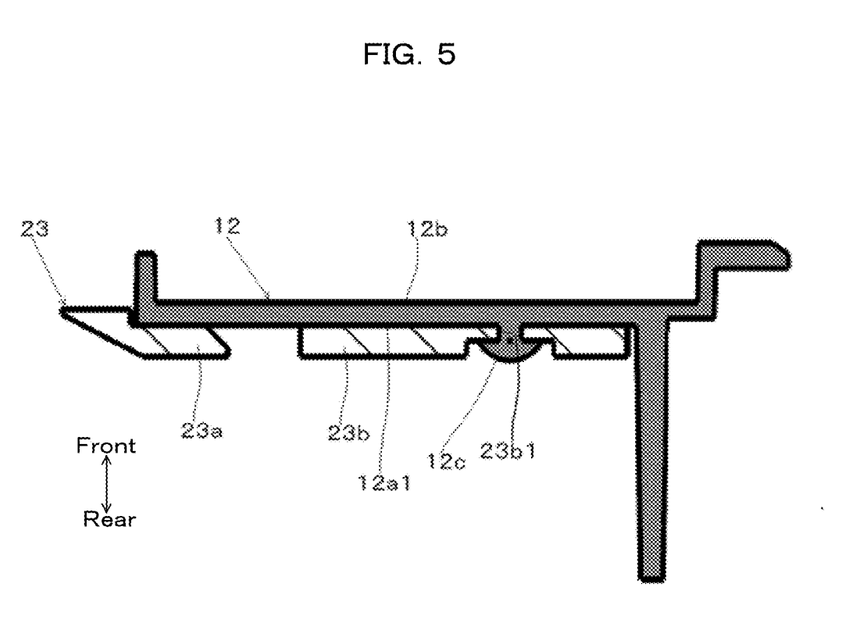
FIG. 5 is a cross-sectional view of a middle case and the first light guide body according to the embodiment of the present description.

The middle case 12 is disposed on the front surface of the circuit board 15. The middle case 12 is formed from a transparent resin such as polypropylene. The middle case 12 is equipped with: two compartments 12a containing respectively the display board 25 of the first indicating needle-type meter 20 and the display board 35 of the second indicating needle-type meter 30, and multiple tubular parts 12b opening in the frontward-rearward directions so as to guide light from the light sources 22 to the indicating needle 21 and the display board 25. Moreover, as illustrated in FIG. 5, multiple (3 in the present example) welding pins 12c are formed in outer bottom surfaces 12a1 of both compartments 12a for fixing of the first light guide body 23.

As illustrated in FIG. 1, the facing member 14 is positioned forward of the middle case 12. The facing member 14 is formed with a shape that conceals regions except for the image display surface 53c of the liquid crystal display unit 50 and the display boards 25 and 35 of the first and second indicating needle-type meters 20 and 30. The facing member 14 is formed from a transparent resin, for example. As illustrated in FIGS. 1 and 2, the facing member 14 is equipped with frame parts 14a located at the outer peripheries of the display board 25 of the first indicating needle-type meter 20 and the display board 35 of the second indicating needle-type meter 30. Each of the frame parts 14a is equipped with a partition wall 14b formed in a range of overlap with the image display surface 53c of the liquid crystal display unit 50. The partition wall 14b is formed to partition between (i) the image display surface 53c and the display board 25 with the exception of a below-described overlapping region 53d, and the image display surface 53c and the display board 35 with the exception of the overlapping region 53d.

Figure 3:
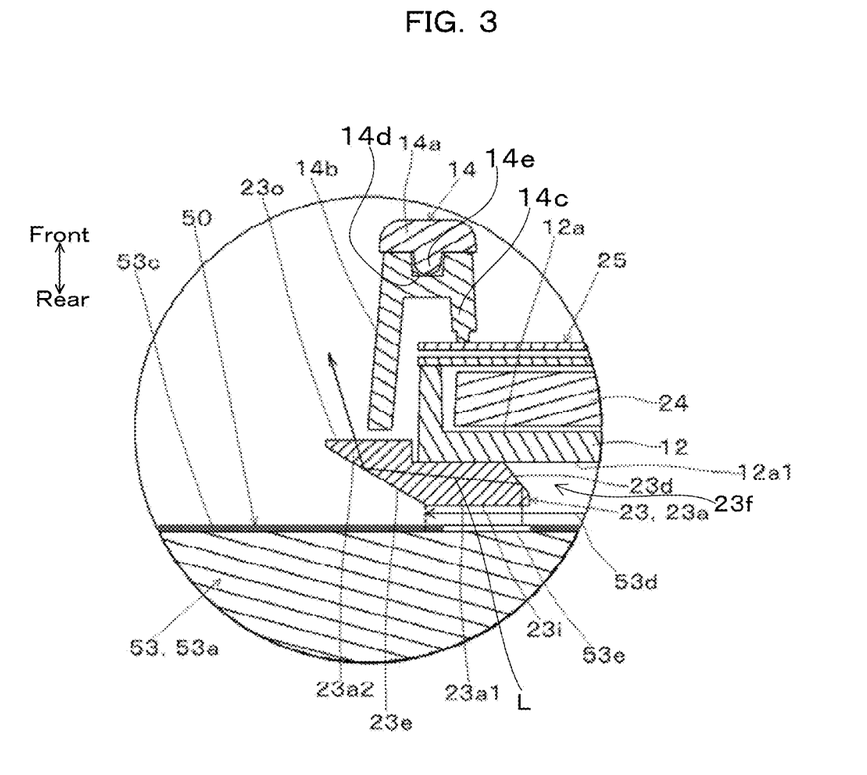
FIG. 3 is a magnified view of region C of FIG. 2.

As illustrated in FIG. 3 that is a magnified view of a region C in FIG. 2, the partition wall 14b in the vicinity of the display board 25 extends in a direction roughly perpendicular to the image display surface 53c, extends to a position in the vicinity of a rearward end of the second light guide body 24, and functions as a outer peripheral surface of the frame part 14a. In this example, the partition wall 14b is tilted so as to approach the display board 25 toward the frontward direction.

The partition wall 14c is disposed adjacent to the partition wall 14b. The partition wall 14c abuts against an outer peripheral part of the display board 25 and thus prevents leakage of light. The partition wall 14b and the partition wall 14c are coupled together via the front edge parts thereof. A concavity 14d is formed in a front surface of the abutting parts of the partition wall 14b and the partition wall 14c. A protuberance 14e formed on a backside surface of the frame part 14a fits into the concavity 14d, and the frame part 14a is coupled to the partition walls 14b and 14c.

Further, configuration of the facing member 14 in the vicinity of the second indicating needle-type meter 30 is substantially also the same as the configuration illustrated in FIG. 3.

As illustrated in FIG. 2, the front case 13 fits into the rear case 11 so as to block the forward opening of the rear case 11. The front case 13 is equipped with a plate-like window part 13a formed from a transparent resin to enable visual recognition of the display boards 25 and 35 and the image display surface 53c of the liquid crystal display unit 50 from the exterior.

The liquid crystal display unit 50 is disposed in front of the circuit board 15, rearward of the first and second indicating needle-type meters 20 and 30, and astride the first indicating needle-type meter 20 and the second indicating needle-type meter 30.

The liquid crystal display unit 50 is equipped with a liquid crystal display panel 53a and multiple light sources 53b.

Each of the light sources 53b includes LEDs that emit light of a prescribed color, such as white light. Each of the light sources 53b is positioned rearward of the liquid crystal display panel 53a. Each of the light sources 53b illuminates the liquid crystal display panel 53a from the backside surface thereof.

The liquid crystal display panel 53a includes a TFT-type liquid crystal display panel. A color filter 53a1 is disposed above each of the pixels of the liquid crystal display panel 53a. By control of an amount of light passing through each of the pixels of the liquid crystal display panel 53a, the controller 60 displays a multi-color image on the image display surface 53c.

As illustrated in FIG. 1, the image display surface 53c of the liquid crystal display unit 50 has two overlapping regions 53d that overlap the display boards 25 and 35 of the first and second indicating needle-type meters 20 and 30. Further, a hatching pattern is used for depicting the two overlapping regions 53d in FIG. 1 to facilitate recognition. The liquid crystal display unit 50 is disposed rearward of the display board 25 and 35, and thus the overlapping region 53d thereof is concealed by the display boards 25 and 35.

As illustrated in FIG. 3, under control of the controller 60, the liquid crystal display unit 50 emits light L of a prescribed color from a light-receiving part-opposing range 53e facing the light-receiving part 23i of the first light guide body 23 described below, within the overlapping region 53d.

The first indicating needle-type meter 20, in addition to the aforementioned indicating needle 21, the light source 22, and the display board 25, is equipped with the first and second light guide bodies 23 and 24 and the indicating needle driver 26.

As illustrated in FIG. 2, the display board 25 is disposed in the compartment 12a of the middle case 12. As illustrated in FIG. 1, a scale 27 is formed in the display board 25 and is a design arrayed in an arc shape to which the indicating needle 21 points. The scale 27 indicates speed. The display board 25 is equipped with a disc-shaped transparent board made of a transparent resin such as polycarbonate and a light-blocking layer formed on a backside surface of the transparent board. The light-blocking layer is formed at parts except those parts overlapping the scale 27, thereby allowing by transmission of light display of letters, graphics, and marks indicating the scale 27. Due to such configuration, the scale 27 of the display board 25 is illuminated from behind by light from the light sources 22 emitted from the second light guide body 24.

As illustrated in FIG. 2, the indicating needle driver 26 is equipped with a motor 26a arranged on the backside surface of the circuit board 15 and a columnar-shaped rotation shaft 26b that is rotated by the motor 26a. The rotation shaft 26b passes through a through hole formed in the circuit board 15 and protrudes from the front side of the circuit board 15. A base end of the indicating needle 21 is mounted on the front end of the rotation shaft 26b.

As illustrated in FIGS. 1 and 2, the indicating needle 21 has a rod-like shape extending in a radial direction of the display board 25, and due to rotation by the indicating needle driver 26 centered on the rotation shaft 26b, points at the scale 27. The indicating needle 21 includes a transparent resin member receiving light from the light sources 22.

As illustrated in FIG. 2, the second light guide body 24 is positioned rearward of the display board 25 and is contained in the compartment 12a of the middle case 12. The second light guide body 24 is formed from a transparent resin. The second light guide body 24 is equipped with a disc-shaped main body part 24a of nearly the same diameter as the display board 25 and a light-receiving part 24b extending toward the light sources 22 from an outer peripheral surface of the main body part 24a. Light emitted from the light sources 22 enters the light-receiving part 24b, is guided to enter the main body part 24a, and is emitted from the main body part 24a. Part of the light emitted from the main body part 24a illuminates the scale 27 by passing through the scale 27 of the display board 25.

As illustrated in FIG. 3, the first light guide body 23 is arranged between the image display surface 53c of the liquid crystal display panel 53a and the outer bottom surface 12a1 of the compartment 12a of the middle case 12. The first light guide body 23 guides light (indicated by an arrow L in FIG. 3) from the light-receiving part-opposing range 53e (region where the hatching is not drawn in FIG. 3) of the image display surface 53c to the partition wall 14b.

Figure 4:
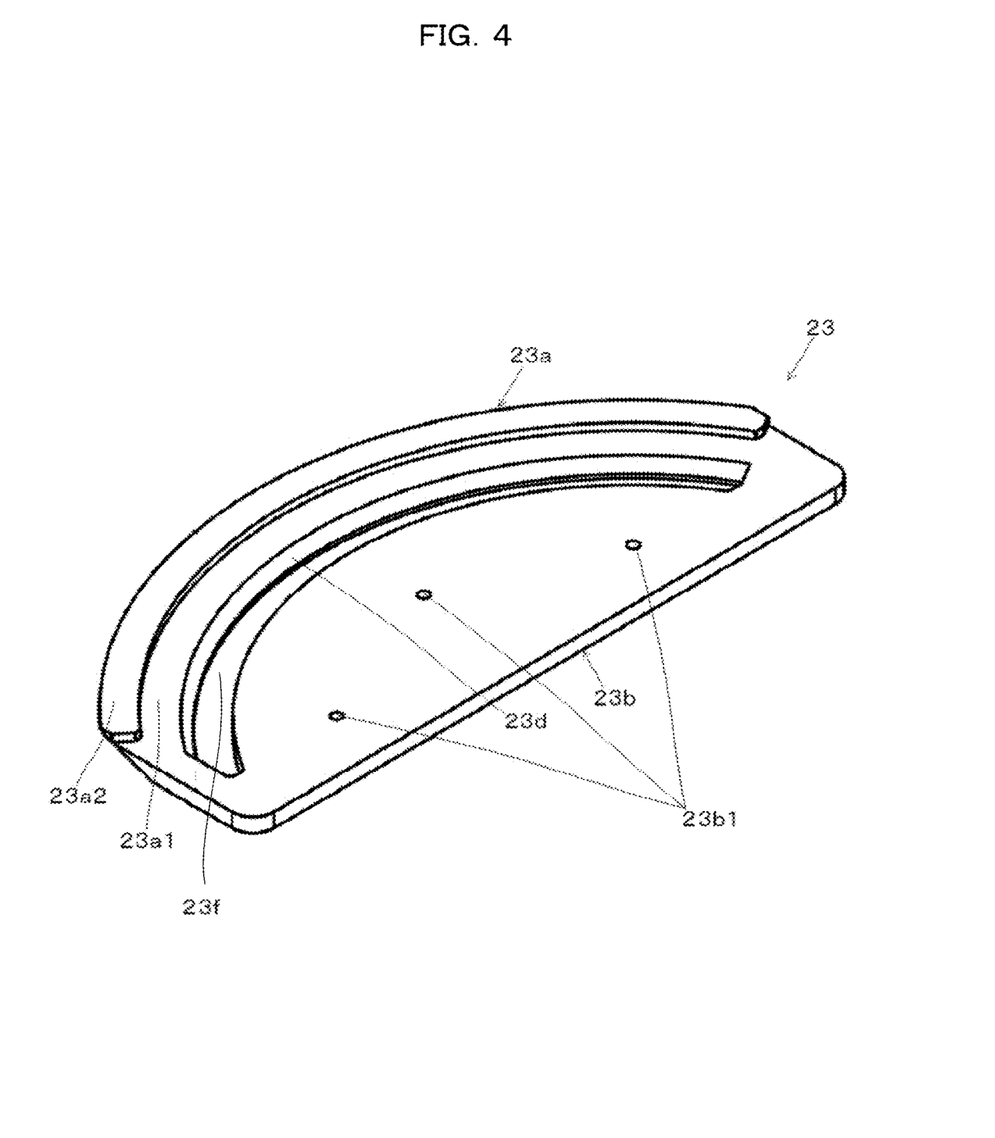
FIG. 4 is a perspective view of a first light guide body according to the embodiment of the present description.

In particular, as illustrated in FIG. 4, the first light guide body 23 is equipped with a light guide part 23a located at the outer peripheral side of the display board 25 and a fixing part 23b located further to an inner peripheral side than the light guide part 23a.

As illustrated in FIG. 3, the light guide part 23a is disposed at a position separated from the image display surface 53c and curves along the outer periphery of the display board 25. The light guide part 23a has an approximately L-shaped cross section. That is, the light guide part 23a is equipped with a first part 23a1 extending along the image display surface 53c of the liquid crystal display panel 53a and a second part 23a2 projecting in a direction of separation from the image display surface 53c from an outside end part of the first part 23a1. The first part 23a1 is positioned in the overlapping region 53d of overlap between the image display surface 53c and the display board 25. The second part 23a2 is positioned rearward of the partition wall 14b so as to overlap the partition wall 14b in the forward-rearward direction. A portion of the second part 23a2 projects more outwardly (display board 25 radial direction outward side) than the partition wall 14b.

More specifically, the first part 23a1 of the light guide part 23a is equipped with a light-receiving part 23i and a first reflection surface 23d. The light-receiving part 23i faces the light-receiving part-opposing range 53e of the image display surface 53c so as to be parallel with the image display surface 53c, and receives the light L from the light source 22 passed through the light-receiving part-opposing range 53e.

The first reflection surface 23d reflects the light L entering from the light-receiving part 23i toward the radial direction outward side of the display board 25. The first reflection surface 23d tilts increasingly toward the radial direction outer side of the display board 25 in the forward direction. As illustrated in FIG. 4, oblong hole 23f, having an arc shape similar to that of the light guide part 23a, is formed between the light guide part 23a and the fixing part 23b in the first light guide body 23. The first reflection surface 23d corresponds to a side surface at the light guide part 23a side of the oblong hole 23f.

As illustrated in FIG. 3, the second part 23a2 of the light guide part 23a is equipped with a light-emitting part 23o and a second reflection surface 23e.

The second reflection surface 23e is formed on the outer peripheral surface of the second part 23a2, and reflects, toward the light-emitting part 23o located frontward, the light L reflected by the first reflection surface 23d. The second reflection surface 23e tilts to the radial direction outer side of the display board 25 increasingly in the forward direction.

The light-emitting part 23o is formed in a front surface of the second part 23a2 and emits the light L forward, including toward the partition wall 14b.

As illustrated in FIG. 4, the fixing part 23b is positioned at the inner peripheral side of the light guide part 23a and is formed in an approximately semi-circular shape. Multiple, three in the present example, pin through holes 23b1 are formed in the fixing part 23b for insertion of welding pins 12c of the middle case 12. As illustrated in FIG. 5, distal tips of the welding pins 12c are heat-welded in a state in which the welding pins 12c are inserted into the pin through holes 23b1. Due to such configuration, the fixing part 23b of the first light guide body 23 is fixed to the outer bottom surface 12a1 of the compartment 12a of the middle case 12. The method of fixing the first light guide body 23 to the middle case 12 is not limited to welding, but rather may be a freely selected method such as gluing or hooking.

In addition to the aforementioned indicating needle 31 and the display board 35, the second indicating needle-type meter 30 is equipped with the first and second light guide bodies 23 and 24 and the indicating needle driver 26. Function and configuration of the first and second light guide bodies 23 and 24 and the indicating needle driver 26 of the second indicating needle-type meter 30 are substantially the same as the function and configuration of the first and second light guide bodies 23 and 24 of the first indicating needle-type meter 20.

Operation

Operation of the vehicular display device 10 having the aforementioned configuration is described below. The controller 60 controls the indicating needle driver 26 of the first indicating needle-type meter 20 in accordance with a speed signal supplied from the outside. Under control of the controller 60, the indicating needle driver 26 rotates the rotation shaft 26b by an angle corresponding to the speed. Rotation of the rotation shaft 26b rotates the indicating needle 21. Pointing of the indicating needle 21 to the scale 27 can provide notification of the speed to the driver. Further, the scale 27 is illuminated from the rear by the second light guide body 24.

In a similar manner, the controller 60 controls rotation angle of the indicating needle 31 of the second indicating needle-type meter 30 in accordance with a rotational speed signal supplied from the outside. Pointing of the indicating needle 31 to the scale 37 can provide notification of the engine rotational speed to the driver. Further, the scale 37 is illuminated from the read by the second light guide body 24.

Moreover, the controller 60 controls transmittance of each pixel of regions other than the overlapping region 53d of the liquid crystal display panel 53a, and controls the light source 53*b*. Due to such operation, the controller 60 displays various types of vehicle information on the image display surface 53*c* except for the overlapping regions 53*d*.

Moreover, the controller 60 causes appropriate illumination of the first light guide body 23. Such operation is described below in detail. Under control of the controller 60, the liquid crystal display unit 50 emits light of a desired color from the light-receiving part-opposing range 53*e* of the image display surface 53*c*. In particular, the controller 60 sets pixels of the light-receiving part-opposing range 53*e* in the liquid crystal display panel 53*a* to the light-transmitting state, and sets pixels other than those of the light-receiving part-opposing range 53*e* within the overlapping regions 53*d* to the non-light-transmitting state, that is, to display black. The light emitted from the light-receiving part-opposing range 53*e* (indicated by reference symbol L in FIG. 3) enters the first light guide body 23 via the light-receiving part 23*i*, and the entering light reaches the first reflection surface 23*d*. The first reflection surface 23*d* reflects this light toward the second reflection surface 23*e* and to the radial direction outside of the display board 25. The second reflection surface 23*e* reflects the light from the first reflection surface 23*d* in the forward direction toward the light-emitting part 23*o*. This light is emitted from the first light guide body 23 via the light-emitting part 23*o*, and the emitted light is directed forward. This emitted light arrives at the driver either directly or by reflection by the partition wall 14*b*. Due to such configuration, the outer peripheral parts of the partition wall 14*b* formed at the peripheries of the first and second indicating needle-type meters 20 and 30 are illuminated. Further, due to operation of the partition wall 14*c*, this light does not enter the interior of the first and second indicating needle-type meters 20 and 30.

Timing of illumination of the outer peripheral part of the partition wall 14*b* is described next. In the case of heightened degree of importance of the vehicle information displayed on the image display surface 53*c* with the exception of the overlapping regions 53*d*, the controller 60 causes light to be emitted to the first light guide body 23 from the light-receiving part-opposing range 53*e*. The phrase "case of heightened degree of importance of the vehicle information" refers to a case in which a preset standard is satisfied, such as when the vehicle speed exceeds a threshold, or when a distance to an intersection at which the vehicle turns right or left is less than a standard value. The controller 60 receives as via communications lines input vehicle information such as operational status of collision avoidance equipment of the vehicle or travel status relative to the road surface such as straying outside of a road lane, and can cause emission of light with the object of providing the driver with notification of such status on the basis of such input.

Effects

The vehicular display device 10 according to the above-described embodiment has the below-described effects.

(1) The vehicular display device 10 is equipped with: the display board 25 that displays the scale 27; the display board 35 that displays the scale 37; the liquid crystal display panel 53*a* including the image display surface 53*c* that displays an image and is arranged so as to have the overlapping region 53*d* that overlaps the display board 25 and where the image display surface 53*c* is further rearward than the display board 25; the light source 53*b* that illuminates the liquid crystal display panel 53*a*; and the first light guide body 23 that is illuminated by receiving light via the liquid crystal display panel 53*a* from the light source 53*b*. The first light guide body 23 is equipped with: the light-receiving part 23*i* arranged between the overlapping region 53*d* of the image display surface 53*c* and the display board 25, to receive light passed through the liquid crystal display panel 53*a* from the light source 53*b*; and the light-emitting part 23*o* that is exposed in the radial direction outside of the display board 25 as viewed by the viewer, and that emits from the first light guide body 23 the light received by the light-receiving part 23*i*.

Due to such configuration, the light-receiving part 23*i* of the first light guide body 23, due to arrangement between the display board 25 and the overlapping region 53*d* of the image display surface 53*c*, can control whether the driver directly sees light from the light source 53*b* passing through the liquid crystal display panel 53*a*. Thus when the first light guide body 23 is illuminated, appearance of the vehicular display device 10 can be improved.

Moreover, due parts of the display boards 25 and 35 overlapping with parts of the liquid crystal display panel 53*a* in the frontward-rearward direction, a sense of unity between the display boards 25 and 35 and the liquid crystal display panel 53*a* can be produced. Moreover, the liquid crystal display panel 53*a* is not necessarily shaped to match the outer shape of the display boards 25 and 35, and a general-purpose liquid crystal display panel 53*a* can be used in the vehicular display device 10. Further, due to the light source for illumination of the first light guide body 23 becoming unnecessary, configuration of the vehicular display device 10 can be simplified.

(2) The vehicular display device 10 is equipped with the partition wall 14*b* partitioning between the display boards 25 and 35 and the image display surface 53*c* with the exception of the overlapping regions 53*d*. The light-emitting part 23*o* of the first light guide body 23 emits light toward the partition wall 14*b*. Due to this configuration, light is emitted toward the partition wall 14*b* from the light-emitting part 23*o* of the first light guide body 23. Therefore, indirect illumination is achieved in the vehicular display device 10, thereby enabling the creation of a three-dimensional effect.

(3) The display boards 25 and 35 are disc-shaped, and are disposed side-by-side in the width direction (lateral direction) so as to sandwich the liquid crystal display panel 53*a* therebetween as seen by the driver. The first light guide bodies 23 each have an arc shape along the outer periphery of the display board 25 and 35, and are arranged as one respective body at both width-direction edges of the image display surface 53*c*. Due to this configuration, a sense of unity between the liquid crystal display panel 53*a* and the opposing display boards 25 and 35 can be produced by the vehicular display device 10. Therefore, appearance of the vehicular display device 10 can be improved.

(4) The liquid crystal display panel 53*a* has the color filter 53*a*1. Due to this configuration, the color of the light from the light source 53*b* passing through the liquid crystal display panel 53*a* can be selected by the color filter 53*a*1. Therefore, the desired color of light can be emitted to the light-receiving part 23*i* of the first light guide body 23, thereby outputting the light of the selected color toward the light-receiving part 23*i* of the first light guide body 23, and the degree of freedom of illumination is increased.

(5) The first light guide body 23 is equipped with the first and second reflection surfaces 23*d* and 23*e* that cause the reflection of light between the light-receiving part 23*i* and the light-emitting part 23*o*. Due to this configuration, the light-receiving part 23*i* can be provided by the first and second reflection surfaces 23*d* and 23*e* at a location hidden by the display board 25, and the light-emitting part 23*o* can be easily provided to the outside of the display board 25.

(6) The light-emitting part 23o of the first light guide body 23 is disposed at a position separated from the image display surface 53c. Due to this configuration, when the first light guide body 23 is illuminated, a sense of floating can be produced by the vehicular display device 10. Therefore, appearance of the vehicular display device 10 can be improved.

(7) The liquid crystal display panel 53a sets to the light-transmitting state the light-receiving part-opposing range 53e facing the first light-receiving part 23i of the first light guide body 23 among the overlapping regions 53d, and sets to the non-light-transmitting state the range outside the light-receiving part-opposing range 53e among the overlapping regions 53d. Due to this configuration, among the overlapping regions 53d capable of visual recognition by the driver, black is displayed in the regions other than the light-receiving part-opposing range 53e. Therefore, appearance of the vehicular display device 10 can be improved.

Modified Example

The present description is not limited to the aforementioned embodiment, and appropriate modifications can be made. For example, although an example is indicated in the aforementioned embodiment in which the color filter 53a1 is disposed in pixel units, a single color filter 53a1 may be disposed across multiple pixels. For example, a single color filter may be disposed above each light-receiving part-opposing range 53e. Further, the color filter 53a1 may be omitted.

In the aforementioned embodiment, although the light-emitting part 23o of the first light guide body 23 is provided at a location separated from the image display surface 53c, arrangement is permissible at a location in the vicinity of the image display surface 53c. In this case, the light guide part 23a of the first light guide body 23 may be formed with a flat plate-like shape.

Although the light guide part 23a of the first light guide body 23 is formed with an arc shape in the aforementioned embodiment, this part may be formed with a linear shape. In this case, the display board 25 may be formed with a segmented shape.

In the aforementioned embodiment, although the first light guide body 23 is equipped with the first and second reflection surfaces 23d and 23e, the number of the reflection surfaces is not limited to this embodiment, and the number may be one or three or more.

Although the first light guide body 23 in the aforementioned embodiment is equipped with the first and second reflection surfaces 23d and 23e, the number of the reflection surfaces is not limited to this number, and the number may be one or three or more. The reflection surfaces 23d and 23e may reflect light due to a boundary between the resin and air, or may reflect light at a boundary of a reflective layer such as a metal layer formed at the surface of the resin.

Although an example is indicated in which the partition wall 14b of the facing member 14 tilts further to approach the display board 25 or 35 towards the forward direction, the angle of tilt is freely selected, and the tilt may be zero. Although the leakage of light to the display boards 25 and 35 is prevented by the partition wall 14c, a configuration may be used in which light leaks. Moreover, the overall configuration of the facing member 14 can be appropriately modified.

Although the first light guide bodies 23 of both of the first and second indicating needle-type meters 20 and 30 are made to illuminate by the controller 60 in the aforementioned embodiment, illumination of just one of the first light guide bodies 23 is permissible. Moreover, the first light guide body 23 may blink at a prescribed period. Further, although the first light guide body 23 is illuminated with the same luminance over the entire region thereof, the illumination may differ in luminance according to position. In this case, the controller 60 may emit light of different light intensities in accordance with position of the light-receiving part-opposing range 53e. Moreover, illumination may be used that differs in color in accordance with the position of the first light guide body 23. In this case, the controller 60 emits light of colors that differ in accordance with the position of the light-receiving part-opposing range 53e.

Although the first light guide body 23 in the aforementioned embodiment is provided so as to overlap the display boards 25 of the first and second indicating needle-type meters 20 and 30 in the overlapping region 53d, the first light guide body 23 may be provided so as to overlap a display board at a position other than that of the first and second indicating needle-type meters 20 and 30, such as just at an indicator.

Although the vehicular display device 10 is equipped with the first and the second indicating needle-type meters 20 and 30 in the aforementioned embodiment, one of the first and the second indicating needle-type meters 20 and 30 may be omitted. Moreover, the subject of indication by the first and the second indicating needle-type meters 20 and 30 is not limited to vehicle speed and engine rotational speed, and gasoline remaining amount, oil temperature, oil pressure, outside air temperature, or the like may be indicated.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2017-184107, filed on Sep. 25, 2017, the entire disclosure of which is incorporated by reference herein.

REFERENCE SIGNS LIST

10 Vehicular display device
11 Rear case
12 Middle case
12a Compartment
12b Tubular part
12c Welding pin
13 Front case
13a Window part
14 Facing member
14a Frame part
14b, 14c Partition wall
14d Concavity
14e Protuberance
15 Circuit board
20 First indicating needle-type meter
21, 31 Indicating needle
22 Light source
23 First light guide body
23a Light guide part 23b Fixing part
23a1 First part
23a2 Second part
23b1 Pin through hole
23d First reflection surface
23e Second reflection surface
23f Oblong hole
23i Light-receiving part
23o Light-emitting part
24 Second light guide body
25 Display board
26 Indicating needle driver
26a Motor
26b Rotation shaft
27 Scale
30 Second indicating needle-type meter
31 Indicating needle
35 Display board
37 Scale
50 Liquid crystal display unit
53a Liquid crystal display panel
53b Light source
53c Image display surface
53a1 Color filter
53d Overlapping region
53e Light-receiving part-opposing range
60 Controller

The invention claimed is:

1. A vehicular display device comprising:
a display board configured to display a design;
a liquid crystal display panel comprising an image display surface configured to display an image, and having an overlapping region in which the image display surface overlaps the display board further rearward than the display board;
a light source configured to illuminate the liquid crystal display panel; and
a light guide body configured to emit light received through the liquid crystal display panel from the light source, wherein
the light guide body comprises: (i) a light-receiving part configured to receive light through the liquid crystal display panel from the light source, the light-receiving part being disposed between the display board and the overlapping region of the image display surface; and (ii) a light-emitting part configured to emit light from the light guide body that is received by the light-receiving part, the light-emitting part being exposed outwardly from the display board as viewed by a viewer.

2. The vehicular display device according to claim 1, further comprising:
a partition wall partitioning between the display board and the image display surface with the exception of the overlapping region, wherein
the light-emitting part of the light guide body emits light toward the partition wall.

3. The vehicular display device according to claim 1, wherein
the display board is disc-shaped, and is a pair of display boards arranged side-by-side in a width direction so as to sandwich the liquid crystal display panel therebetween as viewed by a viewer,
the light guide body has an arc shape along an outer periphery of the display board, and is two light guide bodies, one each disposed at both ends in the width direction of the image display surface.

4. The vehicular display device according to claim 1, wherein
the liquid crystal display panel comprises a color filter configured to produce light of a color selected from among a plurality of colors based on light from the light source.

5. The vehicular display device according to claim 1, wherein
the light guide body further comprises a plurality of reflection surfaces configured to reflect light between the light-receiving part and the light-emitting part.

6. The vehicular display device according to claim 1, wherein
the light-emitting part of the light guide body is disposed at a position separated from the image display surface.

* * * * *